US007878066B2

(12) United States Patent
Scheibner et al.

(10) Patent No.: US 7,878,066 B2
(45) Date of Patent: Feb. 1, 2011

(54) VIBRATION MEASUREMENT SYSTEM

(75) Inventors: Dirk Scheibner, Nürnberg (DE); Jens Makuth, Feucht (DE)

(73) Assignee: Siemens Aktiengesellschaft, München (DE)

( * ) Notice: Subject to any disclaimer, the term of this patent is extended or adjusted under 35 U.S.C. 154(b) by 416 days.

(21) Appl. No.: 12/065,800

(22) PCT Filed: Aug. 2, 2006

(86) PCT No.: PCT/EP2006/064951
§ 371 (c)(1),
(2), (4) Date: Mar. 5, 2008

(87) PCT Pub. No.: WO2007/028686
PCT Pub. Date: Mar. 15, 2007

(65) Prior Publication Data
US 2008/0236284 A1 Oct. 2, 2008

(30) Foreign Application Priority Data
Sep. 5, 2005 (DE) ........................ 10 2005 042 085

(51) Int. Cl.
*G01H 1/00* (2006.01)
*G01P 3/44* (2006.01)
*G01P 15/09* (2006.01)
*G01P 15/125* (2006.01)

(52) U.S. Cl. .................. 73/651; 73/1.38; 73/504.14; 73/514.32

(58) Field of Classification Search ............... 73/514.15, 73/514.29, 514.32, 514.31, 641, 651, 658, 73/660, 661, 504.04, 504.12, 504.14, 504.16, 73/1.37, 1.38
See application file for complete search history.

(56) References Cited

U.S. PATENT DOCUMENTS

| 3,512,402 | A | 5/1970 | Marco et al. |
| 4,419,897 | A | 12/1983 | Matsuoka |
| 5,129,262 | A | 7/1992 | White et al. |
| 6,170,332 | B1 * | 1/2001 | MacDonald et al. ..... 73/514.38 |
| 6,199,874 | B1 | 3/2001 | Galvin et al. |
| 2002/0011107 | A1 * | 1/2002 | Sakai et al. .............. 73/514.32 |
| 2002/0035873 | A1 * | 3/2002 | Sakai et al. ................... 73/649 |

(Continued)

FOREIGN PATENT DOCUMENTS
DE   102004045528 A1   3/2006

(Continued)

Primary Examiner—Hezron Williams
Assistant Examiner—Rose M Miller
(74) Attorney, Agent, or Firm—Henry M. Feiereisen; Ursula B. Day

(57) ABSTRACT

The invention relates to a vibration measurement system for frequency-selective oscillation measurement in particular of low frequencies as are relevant in the field of automation and drive technology. The invention proposes coupling a broadband transmitter structure, which is excited directly by the excitation signal to be determined, via an electrostatic or inductive force to a receiver structure. This force coupling results in amplitude modulation of a carrier signal exciting the receiver structure. The actual excitation signal can be extracted from the spectrum of the amplitude-modulated carrier signal, for example by suitably selecting the frequency of the carrier signal. In order to make an oscillation analysis possible which is as unsusceptible to interference possible, an interference signal brought about, for example, by connector excitations is largely eliminated in advance from the amplitude-modulated carrier signal.

21 Claims, 4 Drawing Sheets

U.S. PATENT DOCUMENTS

2008/0190198 A1* 8/2008 Prandi et al. .............. 73/504.12
2008/0196503 A1* 8/2008 Makuth et al. ................. 73/579

FOREIGN PATENT DOCUMENTS

| | | |
|---|---|---|
| DE | 10 2005 028 214 | 12/2006 |
| EP | 0470639 B1 | 7/1995 |
| EP | 0716308 A2 | 6/1996 |
| EP | 0852708 B1 | 9/2001 |
| EP | 0881477 B1 | 8/2004 |
| WO | WO 0063659 A1 | 10/2000 |
| WO | WO 0120276 A1 | 3/2001 |

* cited by examiner

VIBRATION MEASUREMENT SYSTEM

BACKGROUND OF THE INVENTION

The invention relates to a vibration measurement system for frequency-selective oscillation measurement.

A system such as this is used, for example, for automation and drive technology where it can preferably be used for state monitoring of components that are subject to wear. Furthermore, the invention can be used to monitor manufacturing processes which can be disturbed by an oscillating environment. In addition, the invention can be used to characterize oscillating systems and components.

Production failures resulting from unexpected machine defects can cause direct damage and consequential damage at a considerable level, depending on the field and the nature of the process. In order to improve the reliability of production machines and machine tools, process installations, transport systems and the like, and therefore to reduce downtimes of these production facilities, premature wear and defect identification are therefore becoming ever more important.

For example, in the case of electrical machines, a failure of the production means or of one of its components, (for example the bearings) is frequently indicated by a change in the oscillation behavior. These changes can be detected by vibration analysis. This allows the relevant components to be replaced in good time before the entire system fails, thus avoiding a relatively long production shutdown.

Depending on the frequency range of the relevant oscillations, the frequencies can be measured selectively or can be determined over a broad bandwidth followed by Fourier analysis. For technical reasons, frequency-selective sensors can be used better for analysis of relatively high-frequency oscillations (>1 kHz). Low-frequency oscillations (<1 kHz) are nowadays generally detected by means of a broadband piezoceramic sensor. The individual frequency components are then determined from the measurement signal by means of a Fast Fourier Transformation (FFT) carried out in software or hardware.

Particularly in automation and drive technology, brief shocks lead to structure-borne sound signals with a broadband spectrum which extends over several hundred kilohertz. This secondary excitation, which also acts directly on the receiver structure of the coupled oscillator structure, leads to corruption of the actual measurement signal.

SUMMARY OF THE INVENTION

The invention is based on the object of allowing oscillation analysis which is as impervious to disturbances as possible.

This object is achieved by a vibration measurement system having a transmitter structure which can oscillate, can be excited by an excitation signal to oscillate mechanically at an excitation frequency and is arranged in such a manner with respect to a receiver structure, which can oscillate and can be excited by a carrier signal at a carrier frequency, such that the transmitter structure, when in an excited state, exerts a force, which is dependent on the deflection of the transmitter structure and amplitude-modulates the carrier signal, on the receiver structure, wherein the vibration measurement system has means for generating an output signal from the amplitude-modulated carrier signal, in which output signal any disturbance signal exciting the receiver structure is suppressed.

The vibration measurement system according to the invention uses two structures which can oscillate. The transmitter structure which can oscillate is excited directly by the excitation signal whose amplitude is intended to be determined by the system. The invention is now based on the discovery that the excitation signal to be determined can be transferred to a higher frequency range by a suitable coupling of the transmitter and receiver structures. The amplitude of the excitation signal can be measured on a frequency-selective basis in the higher frequency range at low cost, using simple means. This type of coupling makes it possible, for example, to use a transmitter structure with a resonant frequency which is relatively low in comparison to that of the receiver structure, acting as a broadband acceleration sensor.

The method of operation of the vibration system according to the invention can be explained as follows. The receiver structure is excited using a generally radio-frequency carrier signal. The carrier signal is amplitude-modulated with the excitation signal by coupling the transmitter structure to the receiver structure. This is done by the transmitter structure exerting a force on the receiver structure, which force is dependent on the deflection of the transmitter structure with respect to its rest state. With regard to the frequencies, an arrangement such as this results in multiplicative coupling between these two structures.

The modulation of the carrier signal by the excitation signal results in the excitation signal once again being located in the frequency spectrum of the receiver, as the left and right sidebands of the carrier signal. Spectral evaluation can therefore be carried out by filtering or demodulation. There is therefore no need for highly computation-intensive Fourier transformation of the time-domain signal for spectral evaluation.

The invention is based on the further discovery that the disturbance sensitivity of the vibration measurement system can be reduced considerably by suppression of the disturbance signals in the amplitude-modulated carrier signal. Particularly in an industrial environment such as automation and drive technology, typical disturbance signals are caused by broadband secondary excitation with a frequency spectrum of several hundred kilohertz. Secondary excitation such as this frequently directly excites the receiver structure and thus leads to corruption of the actual measurement signal. Suppression of a disturbance signal which excites the receiver structure in particular directly results in the output signal being produced in a form which allows the excitation signal to be determined from the output signal very well and virtually without corruption.

An output signal with as little corruption as possible can be produced in particular by knowledge of any disturbance variables acting on the receiver structure. It is therefore advantageous for the means for generating the output signal to have detection means for detection of the disturbance signal.

The disturbance signal may be detected in various ways. In one advantageous embodiment of the invention, the disturbance signal can be detected on the receiver structure, in particular when there is no excitation by the carrier signal. In this case, for example, two successive measurements are carried out. First of all, a measurement is carried out without any carrier signal applied. This avoids the force coupling between the transmitter and receiver structures. The receiver structure is therefore excited only by the disturbance signal. The disturbance signal is detected on the receiver structure, and the result is buffer-stored. The result is therefore available for a subsequent, second measurement with the carrier signal applied, and therefore with force coupling between the transmitter and receiver structures, in order to clean up the amplitude-modulated carrier signal which has been corrupted by the disturbance signal.

A further advantageous embodiment of the vibration measurement system is characterized in that the means for generating the output signal have a further structure which can oscillate and can be excited by the disturbance signal, and wherein the disturbance signal can be detected on the further structure. This results in a wider measurement dynamic range since permanent parallel detection of the pure disturbance signal and of the amplitude-modulated carrier signal that has been corrupted by the disturbance signal is achieved. The further structure which can oscillate results in detection of the pure disturbance signal, since the further structure which can oscillate is not coupled to the transmitter structure.

The disturbance signal can be suppressed particularly easily by the further structure which can oscillate being essentially physically identical to the receiver structure. In this case, it can be assumed that the receiver structure and further structure which can oscillate have a largely identical oscillation characteristic.

Simple suppression of the disturbance signal can be achieved in one advantageous refinement of the invention by the means for generating the output signal having subtraction means for subtraction of the disturbance signal from the amplitude-modulated carrier signal. The disturbance signal is subtracted from the amplitude-modulated carrier signal which is initially still corrupted by the excitation of the disturbance signal, thus resulting in an output signal from which the disturbance signal has been removed. In the embodiment of the invention described above, in which the disturbance signal can be detected on the receiver structure in particular without any excitation by the carrier signal, the determined and buffer-stored disturbance signal is subtracted in the subsequent measurement, in which the carder signal is present. If the means for generating the output signal comprise a further structure which can oscillate and can be excited by the disturbance signal, wherein the disturbance signal can be detected on the further structure, the disturbance signal which is detected on the further structure which can oscillate is permanently subtracted from the disturbed, amplitude-modulated carrier signal.

In particular for state monitoring in the field of automation and drive technology, the relevant frequencies are in the range from a few Hertz up to 1 kHz. It is therefore advantageous to provide the vibration measurement system for frequency-selective determination of mechanical oscillations whose frequencies are, in particular, below 1 kHz. Frequencies such as these cannot be detected, or can be detected only with a very large amount of complexity, by conventional frequency-selective measurement systems.

One advantageous embodiment of the vibration measurement system according to the invention, in which the carrier frequency is greater than the excitation frequency, allows the excitation signal that is actually to be determined to be transferred to a higher frequency range in which frequency-selective detection is possible with little complexity.

The vibration measurement system advantageously has an apparatus for setting the carrier frequency. This allows the spectral range which is available for evaluation to be chosen freely. The carrier frequency is advantageously chosen such that the left or right sideband is coincident with a resonance point of the receiver.

The amplitude modulation results in the excitation signal to be evaluated being available as the left and right sidebands of the amplitude-modulated carrier signal in the frequency spectrum. Simple evaluation of this frequency spectrum and/or cost-effective extraction of the excitation signal can be achieved by the receiver structure having a resonant frequency which corresponds essentially to one sideband of the amplitude-modulated carrier signal. Choice of the resonant frequency in this way results in the corresponding sideband and therefore the transferred excitation signal being filtered on a frequency-selective basis. The carrier frequency is in this case expediently chosen such that the left or right sideband is located at the resonance point of the receiver.

In order to allow different excitation frequencies to be determined by the vibration system, it is advantageous for the resonant frequency of the receiver structure and/or of the second system which can oscillate to be variable. The overlap of one sideband of the carrier signal can therefore alternatively be achieved by adjustment of the resonant frequency of the receiver or by adjustment of the carrier frequency. In order to allow the same oscillation characteristics to be achieved by the receiver structure and the further structure which can oscillate, it is also advantageous in this case for the resonant frequency of the further structure which can oscillate to be variable.

The receiver structure and the transmitter structure may be coupled in various ways. In one embodiment, the receiver structure is capacitively coupled to the transmitter structure, and an AC voltage at the carrier frequency can be applied between the receiver structure and the transmitter structure. This results in the force coupling required for amplitude modulation being produced electrostatically.

In this case, it is particularly desirable to use an electrode arrangement in which the coupling of the structures which can oscillate produces a linearly variable force; that is to say the force which the transmitter structure exerts on the receiver structure is intended to be linearly dependent on the deflection of the transmitter structure. In order to achieve this, the receiver and transmitter structures are designed such that, together, they produce a capacitance which is dependent on the square of the deflection of the transmitter structure. A capacitance deflection characteristic such as this can be produced, for example, by the receiver and transmitter structures each having a comb-like structure, with the comb-like structures being arranged such that they engage at least partially in one another. In an embodiment such as this, it is also expedient to provide an evaluation comb which is arranged such that it engages at least partially in the comb-like structure of the receiver structure. The measurement signal and/or the transferred excitation signal can easily be taken from the receiver structure with the aid of the evaluation channel. It is also advantageous for the further structure to be in the form of a comb and to provide a further evaluation comb which engages at least partially in the comb-like structure of the further structure.

A further embodiment of the vibration measurement system according to the invention is characterized in that the receiver structure is inductively coupled to the transmitter structure, and an alternating current at the carrier frequency can be applied to the receiver structure and/or to the transmitter structure. Furthermore, the transmitter structure may also have a permanent magnet which exerts a force on the receiver structure through which a current is passing. It is likewise possible for the receiver structure to have a permanent magnet which exerts a force on the transmitter structure through which current is passing.

Irrespective of the nature of the force coupling between the transmitter structure and the receiver structure, it is advantageous in order to improve the signal-to-noise ratio for the vibration measurement system to have an amplifier for amplification of one component in the spectrum of the output signal, with the component oscillating essentially at the resonant frequency of the receiver structure.

For evaluation purposes, it is advantageous for the vibration measurement system to have an evaluation device for filtering and/or demodulation of the amplitude-modulated carrier signal.

Because the vibration measurement system can be produced at a lower cost than present-day vibration measurement systems, the vibration measurement system may be intended for, in particular, permanent state monitoring of production means. Since the vibration measurement system operates on a frequency-selective basis, there is no need for the considerable hardware and/or software complexity to carry out an FFT as is required for broadband sensors.

An alternative application of the vibration measurement system is characterized in that the vibration measurement system is intended to monitor a vibration-sensitive production process. In this case as well the system can be used for permanent monitoring of oscillations which could endanger the correct process procedure.

BRIEF DESCRIPTION OF THE DRAWING

The invention will be described and explained in more detail in the following text with reference to the exemplary embodiments which are illustrated in the figures, in which.

DETAILED DESCRIPTION OF PREFERRED EMBODIMENTS

Figure 1:
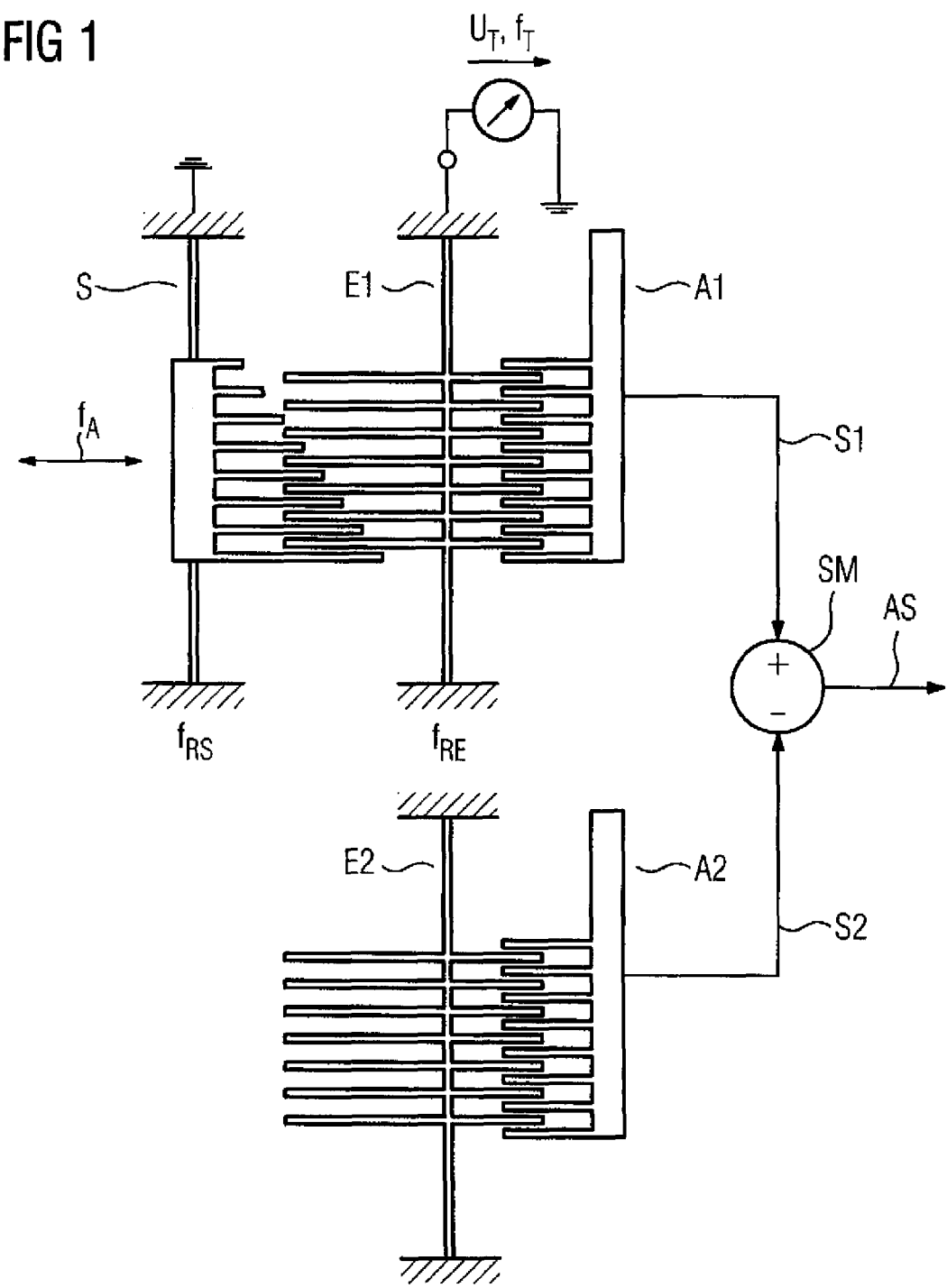
FIG. 1 shows a vibration measurement system with capacitive coupling and parallel subtraction in order to suppress a disturbance signal.

FIG. 1 shows a vibration measurement system with capacitive coupling and parallel subtraction in order to suppress a disturbance signal. The vibration measurement system comprises five comb-like structures S,E1,A1,E2,A2 which are partially coupled to one another via electrostatic forces. It is assumed that the illustrated system is intended for determination of vibration on electrical drive systems, with the relevant oscillations being in the range from a few Hertz to 1 kHz.

The vibration measurement system has a broadband transmitter structure S with a resonant frequency $f_{RS}$ of about 3 kHz. The linear measurement range of the transmitter structure S thus extends up to about 1 kHz. This transmitter structure S is excited directly by a mechanical excitation signal, which originates from the electrical drive and oscillates at the frequency $f_A$. The comb-like structure of the transmitter structure S partially engages in a receiver structure E1 which is likewise in the form of a comb and whose resonant frequency is, for example, one decade higher than the excitation frequency $f_A$, that is to say 10 kHz.

An AC voltage of amplitude $U_T$ at a frequency $f_T$ is applied between the receiver structure E1 and the transmitter structure S. This AC voltage represents the carrier signal, which is modulated by the excitation signal at the excitation frequency $f_A$.

The transmitter structure S and the receiver structure E1 therefore together form a capacitor to which the voltage $U_T$ is applied. The comb-like embodiment as illustrated of these two structures results in the capacitance C of this capacitor depending on the square of the deflection x of the transmitter structure S. Therefore:

$$C(x) \sim x^2$$

One derivative of this relationship is:

$$\frac{dC(x)}{dx} \sim 2x$$

The change in the energy W stored in the capacitor as a function of the deflection can be determined by means of an energy balance:

$$dW = \frac{1}{2} U_T^2 dC(x) = F dx$$

Finally, the relationship between the electrostatic force F and the deflection z is:

$$F = \frac{U_T^2}{2} \frac{dC(x)}{dx} \sim U_T^2 \cdot x$$

The quadrate function of the capacitance profile therefore means that multiplicative coupling occurs between the carrier signal and the deflection x of the transmitter structure.

The amplitude-modulated carder signal S1 is read by means of an evaluation comb A1, and can be amplified electronically there, for example in order to improve the signal-to-noise ratio.

The receiver structure E1 is directly excited not only by the carrier signal but also by secondary excitation which, for example, is caused by bearing damage in the electrical drive, cavitation effects and leakage effects, or electrical discharges. This secondary excitation leads to corruption of the amplitude-modulated carrier signal S1, so that it is impossible to correctly determine the excitation signal directly from the amplitude-modulated carrier signal, S1.

In order to produce an output signal AS in which a disturbance signal S2 caused by the direct secondary excitation of the receiver structure E1 is suppressed, the vibration measurement system has a further structure E2 which can oscillate and which, in contrast to the receiver structure E1, is not coupled to the transmitter structure S and to which no carrier signal is applied. The further structure E2 is arranged such that it is excited by the disturbance signal S2 in the same manner as the receiver structure E1. Since the disturbance signal S2 represents the only excitation of the further structure E2, this can be detected very easily by a further evaluation comb A2. The disturbance signal S2 is detected in parallel in time with the detection of the amplitude-modulated carrier signal S1 with the disturbance signal on it.

In order to produce the output signal AS in which the disturbance signal is suppressed, the disturbance signal S2 is subtracted on-line from the amplitude-modulated carrier signal S1. The vibration measurement system has appropriate subtraction means SM for this purpose. Parallel detection and subtraction of the disturbance signal S2 such as this is distinguished by a very good dynamic response.

Figure 2:
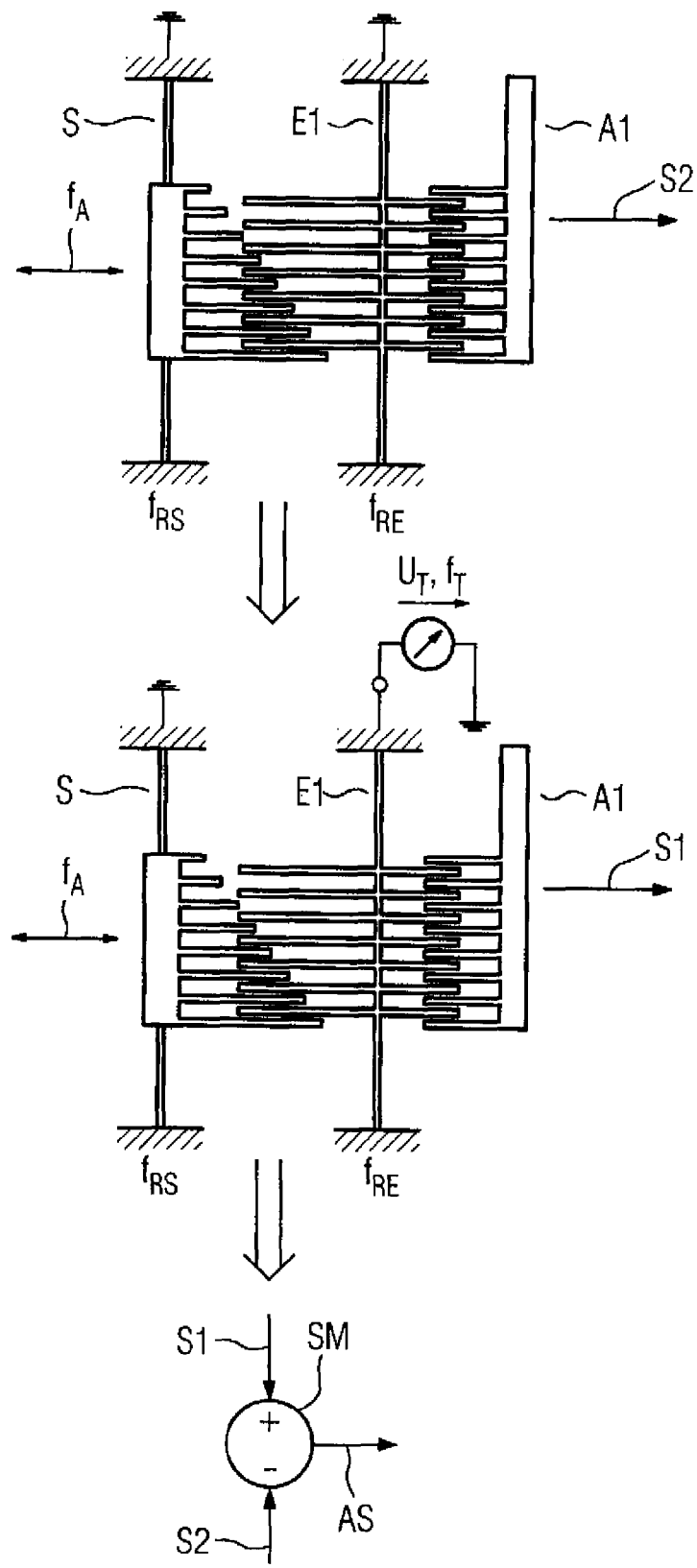
FIG. 2 shows a vibration measurement system with capacitive coupling and series subtraction in order to suppress a disturbance signal.

FIG. 2 shows a vibration measurement system with capacitive coupling and series subtraction in order to suppress a disturbance signal S2. In the embodiment illustrated here, no further structure is used on which the disturbance signal is detected. Instead of this, a two-stage measurement is carried out.

In a first step, a vibration measurement is carried out without any carrier signal applied; that is to say $U_T=0$. Because there is no carrier signal, there is no capacitive coupling either between the transmitter structure S and the receiver structure E1. In consequence, in this situation, the receiver structure E1 is excited solely by the disturbance signal S2, so that this disturbance signal S2 can be detected on the receiver structure E1 by means of a read comb A1.

The carrier signal is then applied to the receiver structure E1 in a second step, such that capacitive coupling and therefore the force coupling required for amplitude modulation exists again between the transmitter structure S and the receiver structure E1. The read comb A1 detects an amplitude-modulated carrier signal S1 whose spectrum is influenced not only by the excitation signal to be determined but also by the disturbance signal S2. In order now to allow the actual excitation signal to be determined, subtraction means SM are used to form the difference between the amplitude-modulated carrier signal S1 and the disturbance signal S2, thus resulting in an output signal AS from which the disturbance signal S2 has essentially been eliminated.

Figure 3:
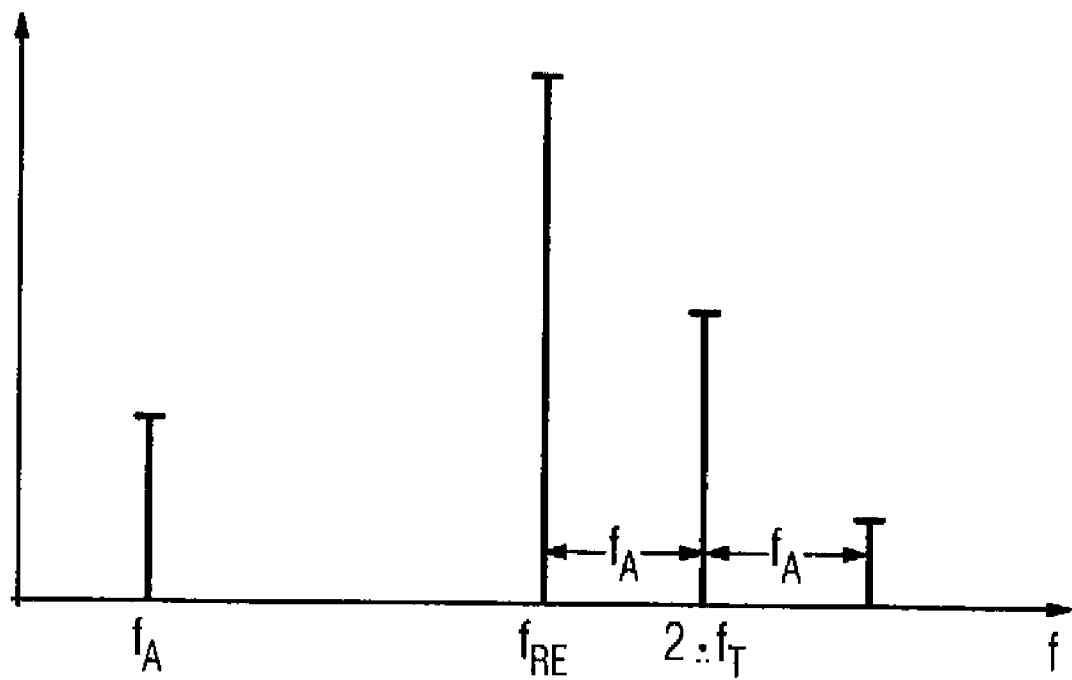
FIG. 3 shows a frequency spectrum of the vibration measurement system with capacitive coupling.

FIG. 3 shows a frequency spectrum of the vibration measurement system with capacitive coupling. The illustration shows oscillation amplitudes of the output signal AS from which the disturbance signal has been removed, plotted against the appropriate frequency components f. The comb structures illustrated in FIG. 1 and FIG. 2 first of all result in the carder frequency $f_T$ being doubled. If, for example, a voltage at the carrier frequency $f_T$ is applied to the receiver structure E1, then this signal is transferred to a frequency $2 f_T$ by the voltage being squared because of the electrostatic force that acts. The excitation frequency $f_A$ of the actually relevant excitation signal is mapped in the amplitude spectrum onto the left and right sidebands of the spectrum produced around twice the carrier frequency $f_T$. For example, if a voltage at the carrier frequency $f_T$ of 5.1 kHz was applied to the receiver structure E and if the frequency $f_A$ of the excitation signal is 200 Hz, then this results in a frequency spectrum of the receiver around 10.2 kHz with a left sideband at 10 kHz and a right sideband at 10.4 kHz. In order to determine the amplitude of the excitation signal oscillating at 200 Hz, the resonant frequency $f_{RE}$ of the receiver structure E1 is now set to 10 kHz. The resonant frequency $f_{RE}$ of the receiver structure E1 therefore corresponds to the left sideband of the illustrated frequency spectrum. This leads to a resonant peak, resulting in the left sideband being available in an amplified form for evaluation. The actual evaluation of the output signal AS is then carried out by filtering or demodulation of this sideband.

Figure 4:
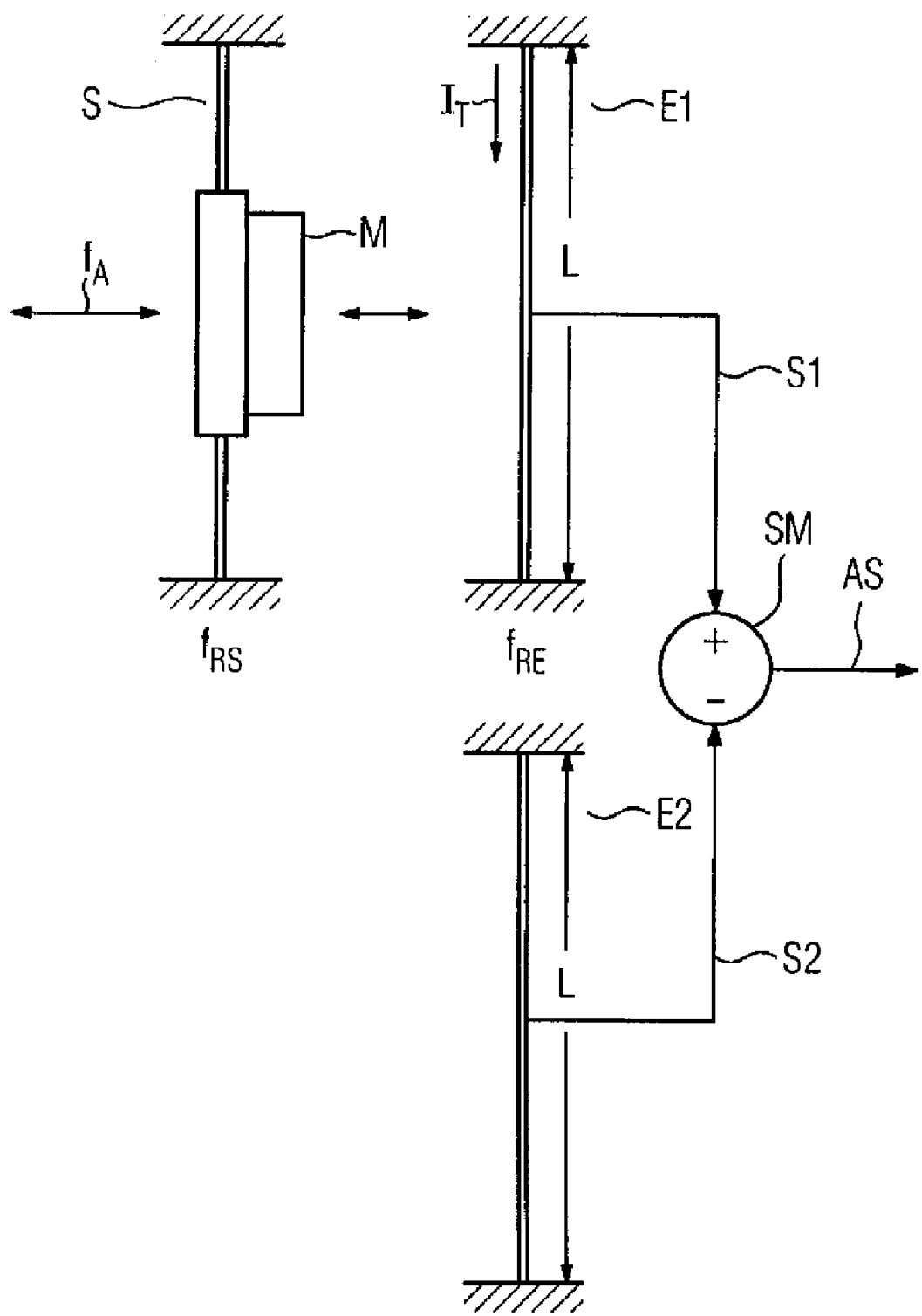
FIG. 4 shows a vibration measurement system with inductive coupling and parallel subtraction in order to suppress a disturbance signal.

FIG. 4 shows a vibration measurement system with inductive coupling. The illustration shows a transmitter structure S, which is excited directly by the excitation signal at a frequency $f_A$, produced by means of a permanent magnet M. The transmitter structure S once again acts as a broadband acceleration sensor and has a relatively low resonant frequency $f_{RS}$. A receiver structure E1 of the vibration measurement system with a resonant frequency $f_{RE}$ which is higher by at least one decade is produced as an electrical conductor of length L. An alternating current $I_T$ is induced at a carrier frequency $f_T$ in this electrical conductor of the receiver structure E1. The magnetic field of the permanent magnet M and the magnetic field, which is produced by the carrier current $I_T$ within the receiver structure E1, produce an electromagnetic coupling force of magnitude $F=I \cdot L \cdot B$ between the transmitter structure S and the receiver structure E. In this case, B denotes the magnetic field strength.

In addition, the illustrated vibration measurement system has a further structure E2 which can oscillate. The further structure is not magnetically coupled to the transmitter structure S, so that it is not excited by the actual excitation signal. The further structure E2 may, however, be excited by a disturbance signal S2 which for example is produced by secondary excitation. This disturbance signal S2 also excites the receiver structure E1 in such a way that the amplitude-modulated carrier signal S1 is initially corrupted by it.

The vibration measurement system has subtraction means SM by means of which the disturbance signal S2 which is detected in parallel on the further structure E2 is subtracted from the amplitude-modulated carrier signal S1. This results in an output signal AS from which disturbance influences have been removed virtually completely thus allowing correct determination of the excitation signal from the frequency spectrum of the output signal AS.

As an alternative to the illustrated embodiment it is, of course, also feasible and covered by the invention for the receiver structure to be formed with the permanent magnet M and for the carrier current $I_T$ to be applied to the transmitter structure.

The method of operation of the illustrated vibration measurement system with inductive coupling is similar to the structures with capacitive coupling illustrated in FIG. 1 and FIG. 2. However, in comparison to electrostatic coupling, the carrier frequency is not doubled since the carrier frequency is not squared during the force coupling, and a simple multiplication is just carried out.

In summary, the invention relates to a vibration measurement system for frequency-selective oscillation measurement in particular of low frequencies such as those which are relevant in the field of automation and drive technology. The invention makes it possible to couple a broadband transmitter structure, which is excited directly by the excitation signal to be determined, with a receiver structure via an electrostatic or inductive force. This force coupling leads to amplitude modulation of a carrier signal which excites the receiver structure. The actual excitation signal can be extracted from the spectrum of the amplitude-modulated carrier signal, for example by suitable choice of the frequency of the carrier signal. In order to allow oscillation analysis which is as impervious to disturbances as possible, a disturbance signal which is produced for example by secondary excitation acting directly on the receiver structure is preferably largely eliminated in advance from the amplitude-modulated carrier signal.

What is claimed is:

1. A vibration measurement system, comprising:
a transmitter structure receiving an excitation signal which causes the transmitter structure to perform a mechanical oscillation at an excitation frequency,
a receiver structure receiving a carrier signal having a carrier frequency which causes the receiver structure to oscillate,
said transmitter structure arranged with respect to the receiver structure such that the transmitter structure, when in an excited state, exerts on the receiver structure a force which depends on a deflection of the transmitter structure and produces an amplitude-modulated carrier signal, and
means for generating an output signal from the amplitude-modulated carrier signal, wherein a disturbance signal exciting the receiver structure is suppressed in the output signal.

2. The vibration measurement system of claim 1, wherein the means for generating the output signal includes detection means for detecting the disturbance signal.

3. The vibration measurement system of claim 2, wherein the detection means detects the disturbance signal at the receiver structure.

4. The vibration measurement system of claim 3, wherein the detection means detects the disturbance signal even in the absence of an excitation by the carrier signal.

5. The vibration measurement system of claim 1, wherein the means for generating the output signal includes an additional oscillating structure excited by the disturbance signal, wherein the disturbance signal is detected on the additional oscillating structure.

6. The vibration measurement system of claim 5, wherein the additional oscillating structure is substantially identical to the receiver structure.

7. The vibration measurement system of claim 1, wherein the means for generating the output signal includes subtraction means for subtracting the disturbance signal from the amplitude-modulated carrier signal.

8. The vibration measurement system of claim 1, wherein the mechanical oscillation has a frequency of less than 1 kilohertz.

9. The vibration measurement system of claim 1, wherein the carrier frequency is greater than the excitation frequency.

10. The vibration measurement system of claim 1, further comprising an apparatus for setting the carrier frequency.

11. The vibration measurement system of claim 1, wherein the receiver structure has a resonance frequency which substantially corresponds to a sideband of the amplitude-modulated carrier signal.

12. The vibration measurement system of claim 11, wherein the resonance frequency of the receiver structure is variable.

13. The vibration measurement system of claim 5, wherein the additional oscillating structure has a variable resonance frequency.

14. The vibration measurement system of claim 1, wherein the receiver structure is capacitively coupled to the transmitter structure, and an AC voltage at the carrier frequency is applied between the receiver structure and the transmitter structure.

15. The vibration measurement system of claim 1, wherein the receiver and transmitter structures in combination produce a capacitance which depends on a square of the deflection of the transmitter structure.

16. The vibration measurement system of claim 1, wherein the receiver and transmitter structures each have a comb-shaped structure, with the comb-shaped structures meshing at least partially with one another.

17. The vibration measurement system of claim 16, further comprising an evaluation comb which engages at least partially in the comb-shaped structure of the receiver structure.

18. The vibration measurement system of claim 5, further comprising an evaluation comb, wherein the additional oscillating structure is configured as a comb and engages at least partially in the evaluation comb.

19. The vibration measurement system of claim 1, wherein the receiver structure is inductively coupled to the transmitter structure, and an AC current at the carrier frequency is applied to the receiver structure or the transmitter structure, or both.

20. A monitoring system for continuous monitoring of production equipment, comprising a vibration measurement system as claimed in claim 1.

21. A monitoring system for monitoring a production process which is susceptive to vibrations, said monitoring system comprising a vibration measurement system as claimed in claim 1.

* * * * *